United States Patent
Takahashi et al.

(10) Patent No.: US 12,426,065 B2
(45) Date of Patent: Sep. 23, 2025

(54) TERMINAL, BASE STATION, AND METHOD FOR ONE-SHOT HARQ-ACK FEEDBACK

(71) Applicant: NTT DOCOMO, INC., Tokyo (JP)

(72) Inventors: Yuki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 386 days.

(21) Appl. No.: 18/001,806

(22) PCT Filed: Jun. 19, 2020

(86) PCT No.: PCT/JP2020/024234
§ 371 (c)(1),
(2) Date: Dec. 14, 2022

(87) PCT Pub. No.: WO2021/255936
PCT Pub. Date: Dec. 23, 2021

(65) Prior Publication Data
US 2023/0247649 A1    Aug. 3, 2023

(51) Int. Cl.
*H04W 72/232* (2023.01)
*H04L 1/1607* (2023.01)
*H04L 1/1812* (2023.01)
*H04W 72/1273* (2023.01)
*H04W 72/566* (2023.01)

(52) U.S. Cl.
CPC ......... *H04W 72/232* (2023.01); *H04L 1/1607* (2013.01); *H04L 1/1812* (2013.01); *H04W 72/1273* (2013.01); *H04W 72/569* (2023.01)

(58) Field of Classification Search
CPC ........... H04W 72/232; H04W 72/1273; H04W 72/569; H04L 1/1607; H04L 1/1812; H04L 1/1864; H04L 1/1896; H04L 1/1854
See application file for complete search history.

(56) References Cited

U.S. PATENT DOCUMENTS

| | | | |
|---|---|---|---|
| 2021/0168776 A1* | 6/2021 | Li | H04W 74/0808 |
| 2022/0110150 A1* | 4/2022 | Lin | H04W 72/23 |
| 2023/0118018 A1* | 4/2023 | Guo | H04L 1/0075 370/328 |

FOREIGN PATENT DOCUMENTS

CN          110708146 A      1/2020

OTHER PUBLICATIONS

English Google Translation of CN 110708146A; Mar. 3, 2025.*

(Continued)

*Primary Examiner* — Afshawn M Towfighi
(74) *Attorney, Agent, or Firm* — Osha Bergman Watanabe & Burton LLP

(57) ABSTRACT

A terminal according to an aspect of the present disclosure includes: a reception section that receives downlink control information (DCI) including a priority indicator field for scheduling a physical downlink shared channel (PDSCH); and a control section that controls transmission of hybrid automatic repeat request acknowledgement (HARQ-ACK) information for the PDSCH on the basis of the DCI, in which the DCI includes a field for at least one of one-shot HARQ-ACK feedback for the PDSCH or an enhanced dynamic HARQ-ACK codebook for the PDSCH. According to one aspect of the present disclosure, radio communication in an NR-Unlicensed (U) system can be appropriately controlled.

6 Claims, 10 Drawing Sheets

(56) References Cited

OTHER PUBLICATIONS

Office Action issued in Japanese Patent Application No. 2022-531236, dated Aug. 13, 2024 (8 pages).
Office Action issued in Chinese Patent Application No. 202080103981.6, dated Sep. 27, 2024 (16 pages).
3GPP TSG RAN WG1 Meeting #100e; R1-2000501; Nokia, Nokia Shanghai Bell; "Remaining issues on DL signals and channels"; e-Meeting, Feb. 24-28, 2020 (16 pages).
3GPP TSG RAN WG1 Meeting #100bis-e; R1-2002432; Qualcomm Incorporated; "TP for Enhancements to Scheduling and HARQ operation for NR-U"; Apr. 20-30, 2020 (14 pages).
3GPP TSG-RAN WG1 Meeting #101-e; R1-2003845; Ericsson; "HARQ Enhancement"; e-Meeting, May 25-Jun. 5, 2020 (9 pages).
3GPP TSG RAN WG1 Meeting #100-e; R1-2001269 "Feature lead summary#1 on NR-U phase 2 email discussion 100e-NR-unlic-NRU-HARQandULscheduling-01 (enhanced Type-2 HARQ-ACK codebook)" Huawei; Feb. 24-Mar. 6, 2020 (30 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2020/024234, mailed Aug. 4, 2020 (5 pages).
Written Opinion issued in International Application No. PCT/JP2020/024234; Dated Aug. 4, 2020 (4 pages).
Office Action issued in Chinese Patent Application No. 202080103981.6, dated Feb. 27, 2025 (14 pages).
Office Action issued in Chinese Application No. 202080103981.6; Dated Jun. 25, 2025 (25 pages).
3GPP TSG RAN WG1 Meeting #100bis-e; R1-2002688 "Feature lead summary#1 on PDCCH enhancements" Moderator (Huawei); E-meeting, Apr. 20-30, 2020 (55 pages).
3GPP TSG RAN WG1 #100-e; R1-2001016 "Summary#1 on UCI enhancements for R16 URLLC" Oppo; e-Meeting, Feb. 24-Mar. 6, 2020 (51 pages).
3GPP TS 38.213 V16.1.0 "3rd Generation Partnership Project; Technical Specification Group Radio Access Network; NR; Physical layer procedures for control (Release 16)" Mar. 2020 (156 pages).

* cited by examiner

TERMINAL, BASE STATION, AND METHOD FOR ONE-SHOT HARQ-ACK FEEDBACK

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). In addition, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In future radio communication systems (for example, 5G, 5G+, New Radio (NR), and 3GPP Rel. 16 or later), the use of an unlicensed band (which may also be referred to as an NR-Unlicensed (U) system) is considered similarly to an existing radio communication system (for example, before 3 GPP Rel. 15).

In addition, introduction of a downlink control information (DCI) format (for example, DCI format 0_2 and DCI format 1_2) for a traffic type such as high-reliability and low-latency communication (for example, ultra-reliable and low-latency communications (URLLC)) in future wireless communication systems (for example, 5G, 5G+, New Radio (NR), and 3GPP Rel. 16 or later) has been studied.

However, whether or not to support an instruction for the NR-U system by the DCI format for a traffic type such as URLLC has not been sufficiently studied.

Therefore, an object of the present disclosure is to provide a terminal, a radio communication method, and a base station capable of appropriately controlling radio communication in a NR-U system.

Solution to Problem

A terminal according to an aspect of the present disclosure includes: a reception section that receives downlink control information (DCI) including a priority indicator field for scheduling a physical downlink shared channel (PDSCH); and a control section that controls transmission of hybrid automatic repeat request acknowledgement (HARQ-ACK) information for the PDSCH on the basis of the DCI, in which the DCI includes a field for at least one of one-shot HARQ-ACK feedback for the PDSCH or an enhanced dynamic HARQ-ACK codebook for the PDSCH.

Advantageous Effects of Invention

According to one aspect of the present disclosure, radio communication in an NR-Unlicensed (U) system can be appropriately controlled.

DESCRIPTION OF EMBODIMENTS (Service (Traffic Type))

Figure 1:
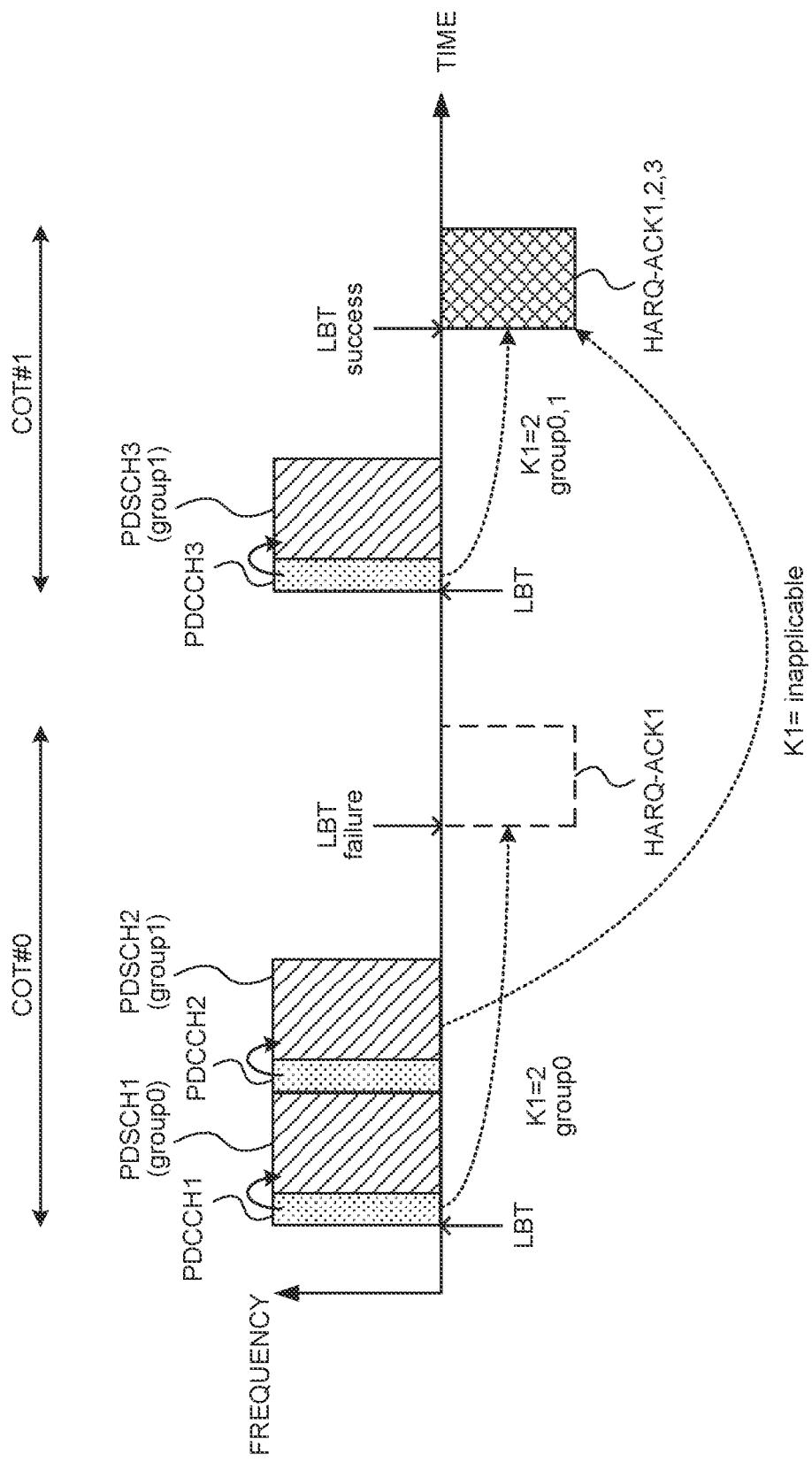
FIG. 1 is a diagram illustrating an example of an enhanced dynamic hybrid automatic repeat request (HARQ) feedback method.

Future radio communication systems (for example, New Radio (NR)) are expected to involve traffic types (also referred to as types, services, service types, communication types, or use cases) such as an enhanced mobile broadband (eMBB), machine type communications that embody multiple simultaneous connection (for example, massive machine type communications (mMTC), Internet of Things (IoT), and high-reliability and low-latency communication (for example, ultra-reliable and low-latency communications (URLLC)). For example, it is required that URLLC have smaller latency and higher reliability than eMBB.

The traffic type may be identified in a physical layer on the basis of at least one of the following.

Logical channels with different priorities

Modulation and coding scheme (MCS) table (MCS index table)

Channel quality indication (CQI) table

DCI format

System information-radio network temporary identifier (RNTI) used for scrambling (masking) of cyclic redundancy check (CRC) bit included in (added to) DCI (DCI format)

Radio resource control (RRC) parameter

Specific RNTI (for example, RNTI for URLLC, MCS-C-RNTI, or the like)

Search space

Predetermined field in DCI (for example, newly added field or reuse of existing field)

Specifically, a traffic type of HARQ-ACK for a physical downlink shared channel (PDSCH) (or physical uplink control channel (PUCCH)) may be determined on the basis of at least one of the followings.

MCS index table used to determine at least one of modulation order, target code rate, or transport block size (TBS) of PDSCH (for example, whether to use MCS index table 3)

RNTI used for CRC scrambling of DCI used for scheduling PDSCH (for example, whether CRC scrambled with C-RNTI or MCS-C-RNTI)

Priority that is configured by higher layer signaling

The traffic type may be associated with communication requirements (requirements and required conditions such as latency and error rate), a data type (voice, data, and the like), or the like.

A difference between URLLC requirements and eMBB requirements may be that URLLC is lower in latency than eMBB or that URLLC requirements include reliability requirements.

For example, eMBB user (U)-plane latency requirements may include that downlink U-plane latency is 4 ms and that uplink U-plane latency is 4 ms. Meanwhile, URLLC U-plane latency requirements may include that downlink U-plane latency is 0.5 ms and that uplink U-plane latency is 0.5 ms. Furthermore, the URLLC reliability requirements may include that a 32-byte error rate is $10^{-5}$ for a U-plane latency of 1 ms.

In contrast, enhancement of the reliability of traffic for unicast data is mainly studied as enhanced ultra reliable and low latency communications (eURLLC). Hereinafter, in a case where URLLC and eURLLC are not distinguished, they are simply referred to as URLLC.

In the NR after Rel. 16, configuring priorities at a plurality of levels (for example, two levels) for a predetermined signal or channel is being studied. For example, it is assumed that communication is controlled (for example, transmission control at the time of collision, and the like) by configuring different priorities for every signal or channel each corresponding to different traffic types (also referred to as services, service types, communication types, use cases, and the like). This makes it possible to control communication by configuring, for the same signal or channel, different priorities depending on a service type or the like.

The priority may be configured for a signal (for example, uplink control information (UCI) such as HARQ-ACK and a reference signal), a channel (PDSCH, physical uplink shared channel (PUSCH), or the like), a HARQ-ACK codebook, or the like. The priority may be defined by a first priority (for example, high) and a second priority (for example, low) that is lower than the first priority. Alternatively, three or more types of priorities may be configured. Notification of the information about the priority may be provided from a base station to the UE by using at least one of higher layer signaling or DCI.

For example, priorities may be configured for HARQ-ACK for PDSCH that is dynamically scheduled, HARQ-ACK for semi-persistent PDSCH (semi-persistent scheduling (SPS) PDSCH), and HARQ-ACK for SPS PDSCH release. Alternatively, priorities may be configured for HARQ-ACK codebooks corresponding to these HARQ-ACKs. Note that, in a case where a priority is configured to the PDSCH, the priority of the PDSCH may be replaced with the priority of HARQ-ACK for the PDSCH.

The UE may control UL transmission on the basis of the priorities in a case where different UL signals or UL channels collide with each other. For example, control may be performed so that UL transmission with high priority is performed and that UL transmission with low priority is not performed (for example, to drop). Alternatively, transmission timing of UL transmission with low priority may be changed (for example, to defer or to shift).

The collision between different UL signals/UL channels may be a case where time resources (or time resources and frequency resources) of the different UL signals or UL channels overlap with each other or a case where transmission timing of the different UL signals or UL channels overlap with each other.

In a case where notification of the priorities is provided using the DCI, whether or not a bit field (for example, priority indicator) for providing notification of the priority to the DCI is configured may be provided in notification or configured from a base station to the UE using higher layer signaling. In addition, in a case where no bit field for providing notification of the priority to the DCI is included, the UE may determine that the priority of the PDSCH (or HARQ-ACK corresponding to the PDSCH) scheduled by the DCI is a specific priority (for example, low).

(Priority Configuration)

Furthermore, in the NR after Rel. 16, configuring priorities at a plurality of levels (for example, two levels) for a predetermined signal or channel is being studied. For example, it is assumed that communication is controlled (for example, transmission control at the time of collision, and the like) by configuring different priorities for every signal or channel each corresponding to different traffic types (also referred to as services, service types, communication types, use cases, and the like). This makes it possible to control communication by configuring, for the same signal or channel, different priorities depending on a service type or the like.

The priority may be configured for a signal (for example, uplink control information (UCI) such as HARQ-ACK and a reference signal), a channel (PDSCH, physical uplink shared channel (PUSCH), or the like), a HARQ-ACK codebook, or the like. The priority may be defined by a first priority (for example, high) and a second priority (for example, low) that is lower than the first priority. Alternatively, three or more types of priorities may be configured. Notification of the information about the priority may be provided from a base station to the UE by using at least one of higher layer signaling or DCI.

For example, priorities may be configured for HARQ-ACK for PDSCH that is dynamically scheduled, HARQ-ACK for semi-persistent PDSCH (semi-persistent scheduling (SPS) PDSCH), and HARQ-ACK for SPS PDSCH release. Alternatively, priorities may be configured for HARQ-ACK codebooks corresponding to these HARQ-ACKs. Note that, in a case where a priority is configured to the PDSCH, the priority of the PDSCH may be replaced with the priority of HARQ-ACK for the PDSCH.

In addition, priorities may be configured to a dynamic grant-based PUSCH, a configured grant-based PUSCH, or the like.

The UE may control UL transmission on the basis of the priorities in a case where different UL signals or UL channels collide with each other. For example, control may be performed so that UL transmission with high priority is performed and that UL transmission with low priority is not performed (for example, to drop). Alternatively, transmission timing of UL transmission with low priority may be changed (for example, to defer or to shift).

The collision between different UL signals/UL channels may be a case where time resources (or time resources and frequency resources) of the different UL signals or UL channels overlap with each other or a case where transmission timing of the different UL signals or UL channels overlap with each other.

In a case where scheduling of shared channels having different priorities is performed using the DCI, how to control a plurality of DCI formats used for scheduling the shared channels and the priority of the shared channel scheduled by the DCI becomes a problem. The shared channels having different priorities may be PDSCHs having different HARQ-ACK priorities or PUSCHs having different priorities.

For example, it is conceivable to control scheduling of shared channels having different priorities by using one of an existing DCI format (for example, DCI format 0_1/1_1) or a new DCI format (for example, DCI format 0_2/1_2) supported in Rel. 15. If the UE is configured to monitor one of the existing DCI format or the new DCI format, the existing DCI format or the new DCI format may support scheduling of both the first priority (or URLLC) and the second priority (or eMBB).

(Unlicensed Band)

In an unlicensed band (for example, 2.4 GHz band, 5 GHz band, or 6 GHz band), it is assumed that a plurality of systems such as a Wi-Fi system and a system (licensed-assisted access (LAA) system) supporting LAA coexist. Therefore, it is necessary to avoid collision of transmissions and/or control interference between the plurality of systems.

In the LAA of the existing LTE system (for example, Rel. 13), a transmitting apparatus of data performs listening (listen before talk (LBT), clear channel assessment (CCA), carrier sense, channel sensing, sensing, and a channel access procedure for confirming the presence or absence of transmission of other pieces of apparatus (for example, base station, user terminal, Wi-Fi device, and so on) before transmission of data in an unlicensed band.

The transmitting apparatus may be, for example, a base station (for example, gNodeB (gNB)) in downlink (DL) and a user terminal (for example, user equipment (UE)) in uplink (UL). Furthermore, a receiving apparatus that receives data from the transmitting apparatus may be, for example, a user terminal in DL and a base station in UL.

In the LAA of the existing LTE system, the transmitting apparatus starts data transmission after a predetermined period (for example, immediately after or after a backoff period) after it is detected that there is no transmission from other pieces of apparatus in the LBT (idle state).

Use of an unlicensed band is also studied in a future radio communication system (for example, 5G, 5G+, New Radio (NR), or 3GPP Rel. 15 or later). An NR system using an unlicensed band may be referred to as an NR-unlicensed (U) system, an NR LAA system, or the like.

It is possible that dual connectivity (DC) between a licensed band and an unlicensed band, stand-alone (SA) of an unlicensed band, or the like be included in the NR-U.

A node (for example, a base station or a UE) in NR-U confirms that a channel is idle by LBT for coexistence with other systems or other operators and then starts transmission.

In an NR-U system, a base station (for example, gNB) or a UE obtains a transmission opportunity (TxOP) and performs transmission when an LBT result is idle. The base station or the UE does not perform transmission when the LBT result is busy (LBT-busy). A transmission opportunity time may be referred to as a channel occupancy time (COT).

Note that the LBT-idle may be replaced with LBT success. LBT-busy may be replaced with LBT failure.

(HARQ-ACK Codebook)

The UE may transmit hybrid automatic repeat request acknowledgement (HARQ-ACK) feedback by using one PUCCH resource for every HARQ-ACK codebook including one or more delivery acknowledgement information (for example, HARQ-ACK) bits. The HARQ-ACK bits may be referred to as HARQ-ACK information, HARQ-ACK information bits, or the like.

Here, the HARQ-ACK codebook may include bits for the HARQ-ACKs in at least one unit of a time domain (for example, a slot), a frequency domain (for example, component carrier (CC)), a spatial domain (for example, a layer), a transport block (TB), and a code block group (CBG) constituting the TB. The HARQ-ACK codebook may be simply referred to as a codebook.

Note that the number (size) of bits included in the HARQ-ACK codebook or the like may be determined in a semi-static or dynamic manner. The HARQ-ACK codebook of which the size is determined semi-statically is also referred to as, for example, a semi-static HARQ-ACK codebook or a type-1 HARQ-ACK codebook. The HARQ-ACK codebook of which the size is determined dynamically is also referred to as, for example, a dynamic HARQ-ACK codebook or a type-2 HARQ-ACK codebook.

Which one of the type-1 HARQ-ACK codebook and the type-2 HARQ-ACK codebook is to be used may be configured in the UE by using a higher layer parameter (for example, pdsch-HARQ-ACK-codebook).

For the type-1 HARQ-ACK codebook, the UE may feed back, in a certain range (for example, a range configured on the basis of the higher layer parameter), the HARQ-ACK bit for a candidate PDSCH (or PDSCH occasion) corresponding to the range, regardless of whether or not there is PDSCH scheduling.

The range may be determined on the basis of at least one of a certain period (for example, a set of a specific number of occasions for receiving the candidate PDSCH or a specific number of monitoring occasions of a physical downlink control channel (PDCCH)), the number of CCs configured or activated in the UE, the number of TBs (layer number or rank), the number of CBGs per TB, or whether or not spatial bundling is applied. The specific range is also referred to as a HARQ-ACK window, a HARQ-ACK bundling window, a HARQ-ACK feedback window, and the like.

In the type-1 HARQ-ACK codebook, the UE reserves the HARQ-ACK bit for the PDSCH in the codebook if they are within the specific range even in a case where the PDSCH is not scheduled for the UE. In a case where it is determined that the PDSCH is not actually scheduled, the UE can feed back the bit as a NACK bit.

Meanwhile, in a case of the type-2 HARQ-ACK codebook, the UE may feed back the HARQ-ACK bit for the PDSCH that is scheduled within the specific range.

Specifically, the UE may determine the number of bits of the type-2 HARQ-ACK codebook on the basis of a specific field (for example, a downlink assignment indicator (index) (DAI) field) in the DCI. Note that the DAI field may include a counter DAI (C-DAI) and a total DAI (T-DAI).

The C-DAI may indicate a counter value of downlink transmission (PDSCH, data, and TB) scheduled within a specific period. For example, the C-DAI in the DCI for scheduling data within the specific period may indicate the number counted in the frequency domain (for example, the CC) first and then in the time domain within the specific period. For example, the C-DAI may correspond to a value obtained by counting PDSCH receptions or semi-persistent scheduling (SPS) releases in ascending order of serving cell indices and then in ascending order of PDCCH monitoring occasions regarding one or more pieces of DCI included in the specific period.

The T-DAI may indicate a total value (total number) of pieces of data scheduled within the specific period. For example, the T-DAI in the DCI for scheduling data in a certain time unit (for example, the PDCCH monitoring occasion) within the specific period may indicate the total number of pieces of data scheduled up to the time unit (also referred to as a point, a timing, or the like) within the specific period.

It is also studied that HARQ-ACK codebooks are separately configured for different service types (or PDSCHs or HARQ-ACKs to which different priorities are configured). That is, it is conceivable that a plurality of HARQ-ACK codebooks are simultaneously configured to support a plurality of service types (or a plurality of priorities). For example, a first HARQ-ACK codebook corresponding to URLLC (for example, a first priority) and a second HARQ-ACK codebook corresponding to eMBB (for example, a second priority) may be configured.

In this case, a first PUCCH configuration parameter (for example, PUCCH configuration or PUCH configuration parameters) corresponding to the first HARQ-ACK codebook and a second PUCCH configuration parameter corresponding to the second HARQ-ACK codebook may be separately supported or configured. The PUCCH configuration parameter may be at least one of a PUCCH resource (or a PUCCH resource set) applied to transmission of the HARQ-ACK, PUCCH transmission timing (for example, K1 set), a maximum code rate (for example, a max-code rate), or PUCCH transmission power.

In this case, first PUCCH configuration information may be applied to HARQ-ACK feedback for URLLC, and second PUCCH configuration information may be applied to HARQ-ACK feedback for eMBB.

(HARQ Process)

For a UE in which carrier aggregation (CA) or dual connectivity (DC) is configured, there may be one independent HARQ entity for each cell (CC) or each cell group (CG). The HARQ entity may manage a plurality of HARQ processes in parallel.

In a radio communication system, data transmission is based on scheduling, and scheduling information for downlink (DL) data transmission is carried in downlink control information (DCI). A HARQ process number (HPN) is given to a HARQ process. The DCI includes a 4-bit HARQ process number field indicating the HARQ process number used for the current data transmission. The HARQ entity manages a plurality (up to 16) of HARQ processes in parallel. That is, as HARQ process numbers, there are HPN0 to HPN15. The HARQ process number is also referred to as a HARQ process identifier (HARQ process ID).

A unit of transmitting uplink (UL) data by a physical uplink shared channel (PUSCH) and a unit of transmitting DL data by a physical downlink shared channel (PDSCH) may be referred to as a transport block (TB). The TB is a unit handled by a media access control (MAC) layer. The control of HARQ (retransmission) may be performed for each TB or may be performed for each code block group (CBG) including one or more code blocks (CBs) in a TB.

The user terminal transmits information indicating positive acknowledgement (ACK)/negative acknowledgement (NACK) of HARQ, which indicates whether or not decoding of a DL transport block having received using the PDSCH is successful, to a base station using a physical uplink control channel (PUCCH), a PUSCH, or the like.

In a case where a plurality of pieces of UL data or a plurality of pieces of DL data is not spatially multiplexed in a physical layer, a single HARQ process corresponds to one transport block (TB). In a case where a plurality of pieces of UL data or a plurality of pieces of DL data is spatially multiplexed in the physical layer, a single HARQ process may correspond to one or more transport blocks (TBs).

(Enhanced Dynamic HARQ Feedback)

In Rel. 16 and later, it is considered to request or trigger feedback of a HARQ-ACK codebook including a plurality of (for example, all) HARQ-ACK processes to the UE in order to provide a transmission opportunity for HARQ-ACK feedback due to LBT failure in the UE or misdetection of the PUCCH in the base station. The HARQ-ACK processes (for example, DL HARQ-ACK processes) may be HARQ-ACKs on all CCs configured for the UE in the PUCCH group.

The feedback of HARQ-ACK (or HARQ-ACK codebook) including a plurality of HARQ-ACK processes may be referred to as enhanced dynamic HARQ-ACK feedback, group-based HARQ feedback, an enhanced dynamic HARQ-ACK codebook, and the like. Notification of the enhanced dynamic HARQ-ACK feedback may be provided from the base station to the UE by using a specific DCI format. The specific DCI format may be a UE-specific DCI format (for example, DCI format 1_1).

The specific DCI format (for example, DCI format 1_1) may include a specific field to make notification of (request or trigger) the enhanced dynamic HARQ feedback. The specific field may be at least one of a PDSCH group index field or a Number of requested PDSCH group(s) field.

The specific field (for example, the PDSCH group index field or the Number of requested PDSCH group(s) field) included in the specific DCI format (for example, DCI format 1_1) may have a bit length of 1 bit in a case where a specific higher layer parameter (pdsch-HARQ-ACK-Codebook) is set to enhanced dynamic (for example, enhancedDynamic-r16 or enhancedDynamic), and may have a bit length of 0 bits in other cases.

The PDSCH group index may be an index specifying a PDSCH group scheduled by the DCI including the PDSCH group index.

In a case where a value of the Number of requested PDSCH group(s) field in the DCI is 0, the UE may transmit one or more HARQ feedbacks for the PDSCH group scheduled by the DCI on a certain resource. In a case where the value of the Number of requested PDSCH group(s) field in the DCI is 1, the UE may transmit one or more HARQ feedbacks for the PDSCH group scheduled by the DCI and a PDSCH group different from the PDSCH group scheduled by the DCI on a certain resource. In other words, in a case where the value of the Number of requested PDSCH group(s) field in the DCI is 1, the UE may transmit the HARQ feedback for the PDSCH for which the PDSCH group indexes 0 and 1 are set on a certain resource.

In addition, the specific DCI format (for example, DCI format 1_1) may include a specific field (for example, a New feedback indicator (NFI) field).

The specific field (for example, the New feedback indicator field) included in the specific DCI format (for example, DCI format 11) may have a bit length of 2 bits in a case where a specific higher layer parameter (pdsch-HARQ- ACK-Codebook) is configured as enhancedDynamic-r16 and another higher layer parameter (NFI-TotalDAI-Included-r16) is configured (NFI-TotalDAI-Included-r16=enable). In addition, the specific field (for example, the New feedback indicator field) may have a bit length of 1 bit in a case where a specific higher layer parameter (pdsch-HARQ-ACK-Codebook) is configured as enhancedDynamic-r16, and another higher layer parameter (NFI-TotalDAI-Included-r16) is not configured, and may have a bit length of 0 bits in other cases.

Note that the another higher layer parameter (NFI-TotalDAI-Included-r16) may be a parameter indicating whether or not the NFI and a T-DAI field of an unscheduled PDSCH group are included in non-fallback DL grant DCI (for example, DCI format 1_1).

Note that a UE operation for the new feedback indicator will be described in detail below.

The UE to which the enhanced dynamic HARQ-ACK feedback has been requested or triggered may feed back, using a PUCCH/PUSCH, a codebook including one or more HARQ-ACK processes.

FIG. 1 is a diagram illustrating an example of an enhanced dynamic HARQ feedback method. In the example of FIG. 1, the UE monitors PDCCH1 and PDCCH2 in COT #0 and monitors PDCCH3 in COT #1. PDSCH1, PDSCH2, and PDSCH3 are scheduled by DCI transmitted on each of PDCCH1, PDCCH2, and PDCCH3. A PDSCH group index indicated for PDSCH1 is 0, and PDSCH group indexes indicated for PDSCH2 and PDSCH3 are 1.

In the example of FIG. 1, the UE starts LBT in start symbols of PDCCH1 and PDCCH3. The UE is instructed by PDCCH1 to transmit HARQ-ACK1 for a PDSCH (PDSCH1) of the group 0 in a HARQ-ACK transmission resource in COT #0 (HARQ feedback timing (PDSCH-to-HARQ_feedback timing indicator), K1 is 2). When the LBT in COT #0 fails, the UE does not transmit HARQ-ACK1.

Furthermore, in the example of FIG. 1, for HARQ-ACK2 for a PDSCH (PDSCH2) of the group 1, in a case where the value (K1) of the HARQ feedback timing included in the DCI received by PDCCH2 is inapplicable, the UE does not transmit HARQ-ACK2 (retains HARQ-ACK2) in the HARQ-ACK transmission resource in COT #0.

Further, in the example of FIG. 1, the UE is instructed by PDCCH3 to transmit HARQ-ACK3 for a PDSCH (PDSCH3) of the group 1 in the HARQ-ACK transmission resource in COT #1 (K1 is 2). Since the value of the Number of requested PDSCH group(s) field included in the DCI of PDCCH3 is 1, HARQ-ACK for a PDSCH corresponding to a PDSCH group (PDSCH group 1) scheduled by PDCCH3 and a PDSCH group (PDSCH group 0) that is not scheduled by PDCCH3 is transmitted in the HARQ-ACK transmission resource in COT #1.

In the example of FIG. 1, when LBT in COT #1 is successful, the UE transmits HARQ-ACK3. At this time, the UE multiplexes HARQ-ACK1 that has not been transmitted due to the LBT failure in COT #0 and retained HARQ-ACK2 on a HARK-ACK3 transmission resource to transmit HARQ-ACK1 and HARQ-ACK2.

<One-Shot HARQ-ACK Feedback>

In Rel. 16 and later, it is studied to request or trigger feedback of a HARQ-ACK codebook including a plurality of (for example, all) HARQ-ACK processes to the UE in order to provide a transmission opportunity for HARQ-ACK feedback due to an LBT failure at the UE or misdetection of the PUCCH at the base station. The HARQ-ACK processes (for example, DL HARQ-ACK processes) may be HARQ-ACKs on a plurality of (for example, all) CCs configured for the UE in the PUCCH group.

The feedback of HARQ-ACK (or HARQ-ACK codebook) including a plurality of (for example, all) HARQ-ACK processes on a plurality of (for example, all) CCs may be referred to as one-shot HARQ-ACK feedback, one-shot HARQ feedback, or HARQ-ACK one-shot feedback. Notification of the one-shot HARQ feedback may be provided from the base station to the UE by using a specific DCI format. The specific DCI format may be a UE-specific DCI format (for example, DCI format 1_1).

The specific DCI format (for example, DCI format 1_1) may include a specific field to make notification of the one-shot HARQ feedback. The specific field may be a One-shot HARQ-ACK request field.

The specific field (for example, the One-shot HARQ-ACK request field) included in the specific DCI format (for example, DCI format 1_1) may have a bit length of 1 bit in a case where a specific higher layer parameter (pdsch-HARQ-ACK-OneShotFeedback-r16) is configured, and may have a bit length of 0 bits in other cases.

The one-shot HARQ-ACK request may be a parameter that requests or triggers the UE to transmit a plurality of (for example, all) HARQ processes on a certain resource.

In a case where the value of the one-shot HARQ-ACK request is 0, the UE may transmit HARQ feedback for a PDSCH scheduled by DCI including the one-shot HARQ-ACK request on a certain resource. In a case where the value of the one-shot HARQ-ACK request is 1, the UE may transmit untransmitted HARQ feedback for a PDSCH, and HARQ feedback for a PDSCH scheduled by DCI including the one-shot HARQ-ACK request on a certain resource.

The UE to which the one-shot HARQ-ACK feedback has been requested or triggered may feed back, using a PUCCH/PUSCH, a codebook including a plurality of (for example, all) HARQ-ACK processes on the respective CCs that have been configured. At this time, HARQ mismatch between the UE and the gNB can be avoided by including a new data indicator (NDI) in the feedback.

Figure 2:
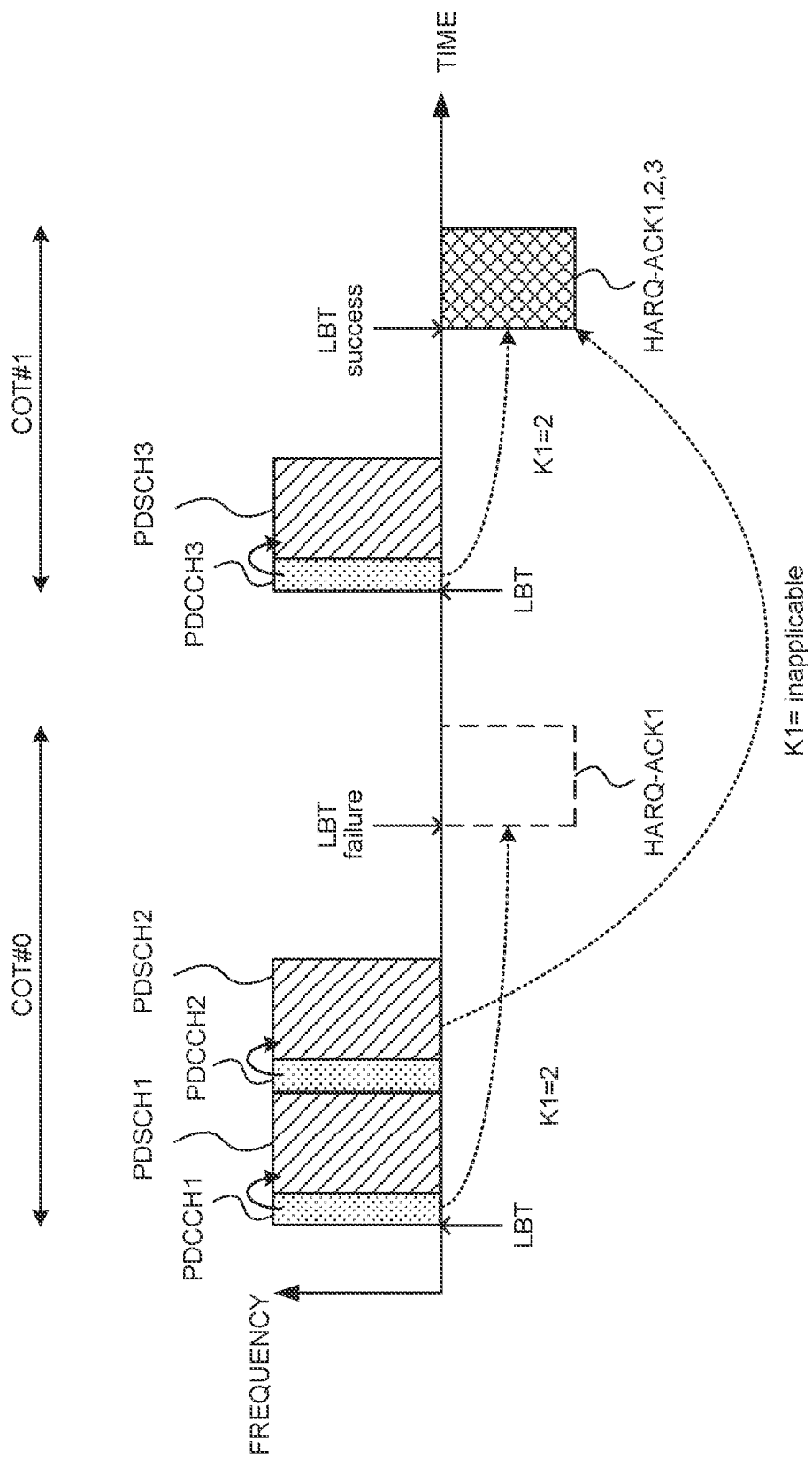
FIG. 2 is a diagram illustrating an example of a one-shot HARQ feedback method.

FIG. 2 is a diagram illustrating an example of a one-shot HARQ feedback method. Arrangement of respective channel resources and LBT timings in the example of FIG. 2 are the same as those in FIG. 1.

In the example of FIG. 2, when LBT in COT #0 fails, the UE does not transmit HARQ-ACK1. In addition, for HARQ-ACK2 for PDSCH2, in a case where the value (K1) of a HARQ feedback timing included in DCI received by PDCCH2 is inapplicable, the UE does not transmit HARQ-ACK2 (retains HARQ-ACK2) in a HARQ-ACK transmission resource in COT #0.

Further, in the example of FIG. 2, the UE is instructed by PDCCH3 to transmit HARQ-ACK3 for a PDSCH (PDSCH3) of the group 1 in the HARQ-ACK transmission resource in COT #1 (K1 is 2). When LBT in COT #1 is successful, the UE transmits HARQ-ACK3. At this time, in a case where the one-shot HARQ feedback is instructed by DCI received by PDCCH3, the UE multiplexes HARQ-ACK1 that has not been transmitted in COT #0 due to the LBT failure and retained HARQ-ACK2 on a HARK-ACK3 transmission resource to transmit HARQ-ACK1 and HARQ-ACK2.

(New Feedback Indicator)

The new feedback indicator (NFI) included in DCI is a field (signaling) indicating whether or not to reset generation/retaining (state) (for example, ACK or NACK) of previous HARQ-ACK information for a specific HARQ process ID.

The C-DAI and the T-DAI are accumulated in a PDSCH group regardless of a PUCCH transmission opportunity. In other words, the C-DAI and the T-DAI are not reset by the PUCCH transmission opportunity. In addition, when the HARQ-ACK codebook has been transmitted, the UE does not retain (reset) the HARQ-ACK information.

DCI (for example, DCI format 1_1) for scheduling a PDSCH may include at least one of the C-DAI field, the T-DAI field, the PDSCH group index (GI) field, the NFI field, or the Number of requested PDSCH group(s) (RG) field.

A bit of the NFI indicates that the C-DAI and the T-DAI are flushed, and generates (retains) another HARQ-ACK information for new feedback. In a case where the bit of the NFI is not toggled, the C-DAI and the T-DAI are maintained (not reset). On the other hand, in a case where the bit of the NFI is toggled, the C-DAI and the T-DAI are reset.

In a case where the NFI in DCI has a bit length of 1 bit, the NFI is a field indicating whether or not a C-DAI, a T-DAI, and HARQ-ACK information corresponding to a PDSCH group (GI) indicated by the DCI are reset.

In a case where the NFI in DCI has a bit length of 2 bits, each bit of the NFI corresponds to one PDSCH group. Each bit is a field indicating whether or not the C-DAI, the T-DAI, and the HARQ-ACK information of the corresponding PDSCH group are reset.

The first (higher) bit of the 2-bit NFI corresponds to a PDSCH group indicated by the DCI out of the two PDSCH groups. The second (lower) bit of the 2-bit NFI corresponds to a PDSCH group other than the PDSCH group indicated by the DCI, of the two PDSCH groups.

The first bit and the second bit may be a first NFI field (first New_Feedback indicator field) and a second NFI field (second New_Feedback indicator field), respectively. The first bit and the second bit may correspond to a lower bit and a higher bit, respectively.

Figure 3:
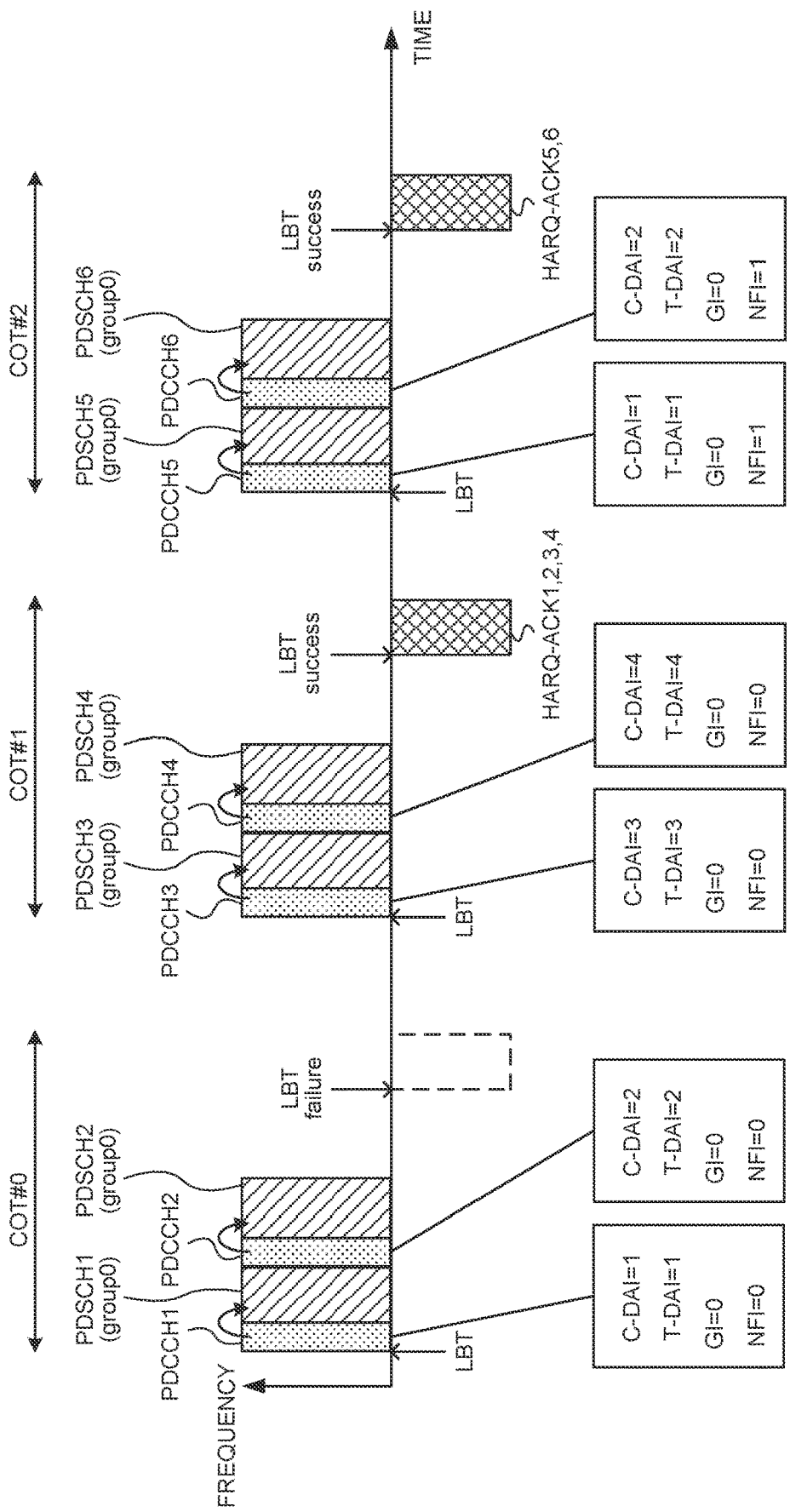
FIG. 3 is a diagram illustrating an example of retaining and resetting of HARQ-ACK information by a new feedback indicator (NFI).

FIG. 3 is a diagram illustrating an example of retaining and resetting of HARQ-ACK information by the NFI. FIG. 3 illustrates an example in which the number of bits of the NFI is 1. In the example of FIG. 3, PDSCH1 to PDSCH6 are each scheduled by DCI received by each of PDCCH1 to PDCCH6. In the example of FIG. 3, all PDSCH group indexes (GI) indicated by the DCI in PDSCH1 to PDSCH6 is 0. HARQ-ACK1 for PDSCH1 and HARQ-ACK2 for PDSCH2 are transmitted on transmission resources of HARQ-ACK3 and HARQ-ACK4 for PDSCH3 and PDSCH4, respectively, due to the LBT failure in COT #0.

In the example of FIG. 3, the UE receives DCI including the value 0 of the NFI until transmitting HARQ-ACK. Meanwhile, the C-DAI and the T-DAI are accumulated. The UE performs transmission of HARQ-ACK1 to HARQ-ACK4, and then receive, by PDCCH5, DCI whose value of the NFI is 1. In this case, the generation/retaining (state) of the C-DAI, the T-DAI, and the HARQ-ACK information is reset.

Figure 4:
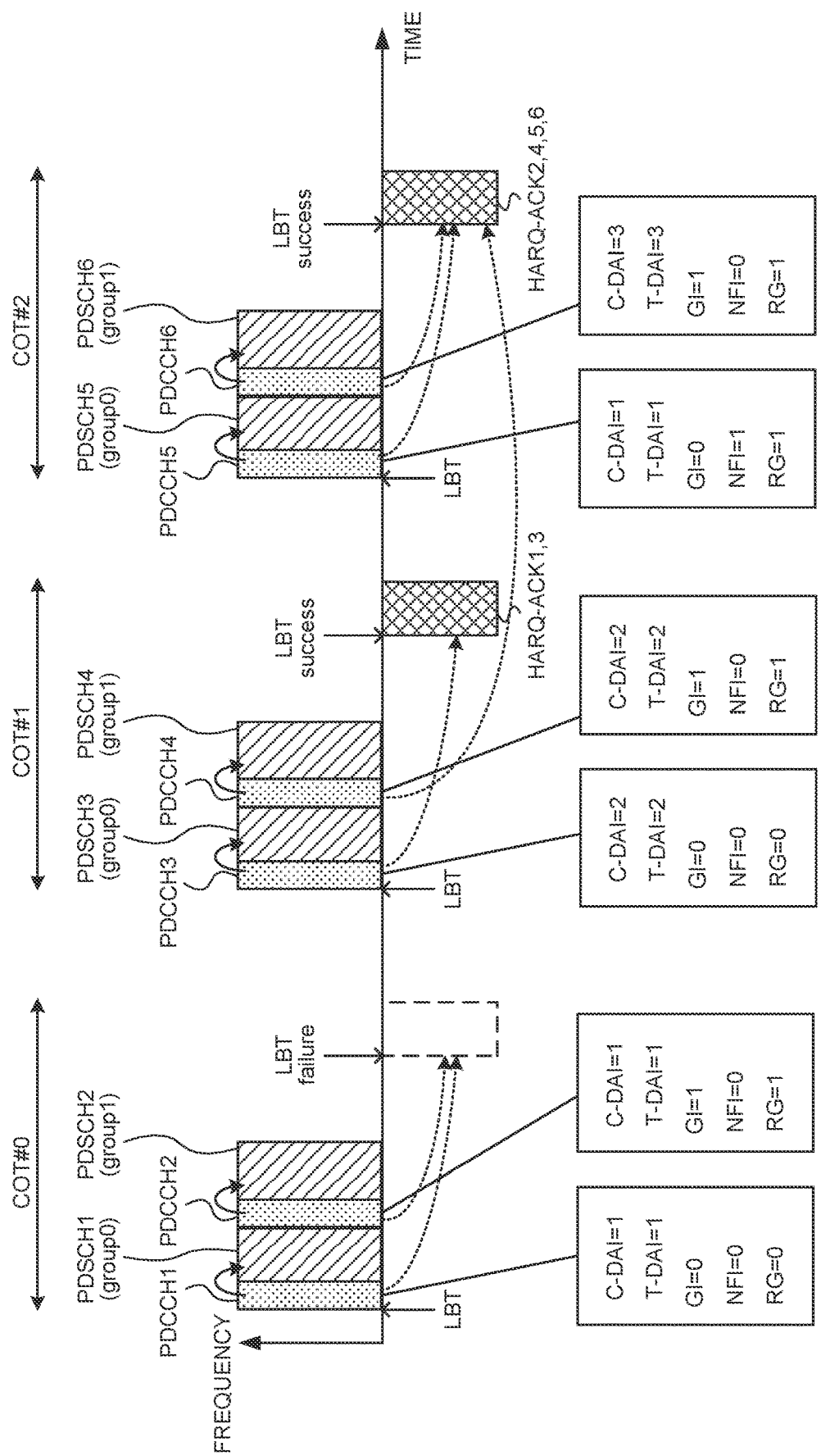
FIG. 4 is a diagram illustrating another example of retaining and resetting of the HARQ-ACK information by the NFI.

FIG. 4 is a diagram illustrating another example of retaining and resetting of the HARQ-ACK information by the NFI. FIG. 4 illustrates an example in which the number of bits of the NFI is 1. In the example of FIG. 4, a PDSCH group index (GI) indicated for PDSCH1, PDSCH3, and PDSCH5 is 0, and a PDSCH group index indicated for PDSCH2 and PDSCH4 is 1.

The UE is notified that HARQ-ACK1 and HARQ-ACK2 for PDSCH1 and PDSCH2 are transmitted in the HARQ-ACK transmission resource in COT #0, but HARQ-ACK1 and HARQ-ACK2 are not transmitted in the HARQ-ACK transmission resource in COT #0 due to the LBT failure in COT #0.

The UE is notified that HARQ-ACK3 for PDSCH3 is transmitted in the HARQ-ACK transmission resource in COT #1. When the LBT in COT #1 is successful, since the value of the number of requested PDSCH groups (RG) included in DCI received by PDCCH3 is 0, HARQ-ACK of only a PDSCH group (GI=0) scheduled by PDCCH3 is transmitted in the HARQ-ACK transmission resource in COT #1. Here, the transmitted HARQ-ACK corresponds to GI=0, and includes HARQ-ACK retained by the UE, that is, HARQ-ACK1 and HARQ-ACK3.

HARQ-ACK4 for PDSCH 4 is retained because the value (K1) of a HARQ feedback timing included in DCI received by PDCCH4 is an inapplicable value.

The UE is notified that HARQ-ACK5 and HARQ-ACK 6 for PDSCH5 and PDSCH6 are transmitted in the HARQ-ACK transmission resource in COT #2. When the LBT in COT #2 is successful, since the value of the Number of requested PDSCH group (RG) field included in DCI received by PDCCH6 is 1, HARQ-ACKs of both PDSCH groups 0 and 1 (GI=0 and 1) are transmitted in the HARQ-ACK transmission resource in COT #2. Here, the transmitted HARQ-ACK includes, for both the PDSCH groups 0 and 1, HARQ-ACK retained by the UE, that is, HARQ-ACK2, HARQ-ACK4, and HARQ-ACK6, and HARQ-ACK5 for PDSCH5 scheduled by PDCCH5.

For each GI (PDSCH group), the C-DAI and the T-DAI are accumulated until the transmission of the HARQ-ACK corresponding to the GI is performed. In the example of FIG. 4, for GI=0, the C-DAI and the T-DAI included in DCI of PDCCH1 that schedules PDSCH1 are 1, and the C-DAI and the T-DAI included in DCI of PDCCH3 that schedules PDSCH3 are 2. In a case where the NFI included in DCI for scheduling a PDSCH is toggled, the C-DAI and the T-DAI corresponding to a GI (PDSCH group) indicated by the DCI are reset.

In the example of FIG. 4, since the transmission of the HARQ-ACK1 and HARQ-ACK3 is successful in the HARQ-ACK transmission resource in COT #1, the value of the NFI included in DCI of PDCCH5 that schedules PDSCH5 corresponding to GI=0 in COT #2 is toggled (is 1), and the C-DAI and the T-DAI are reset. On the other hand, the C-DAI and the T-DAI included in DCI of PDCCH2 that schedules PDSCH2 corresponding to GI=1 are 1, the C-DAI and the T-DAI included in DCI of PDCCH4 that schedules PDSCH4 are 2, and the C-DAI and the T-DAI included in DCI of PDCCH6 that schedules PDSCH6 are 3 (since the value of the NFI included in any DCI is not toggled (remains 0), the C-DAI and the T-DAI are accumulated).

Figure 5:
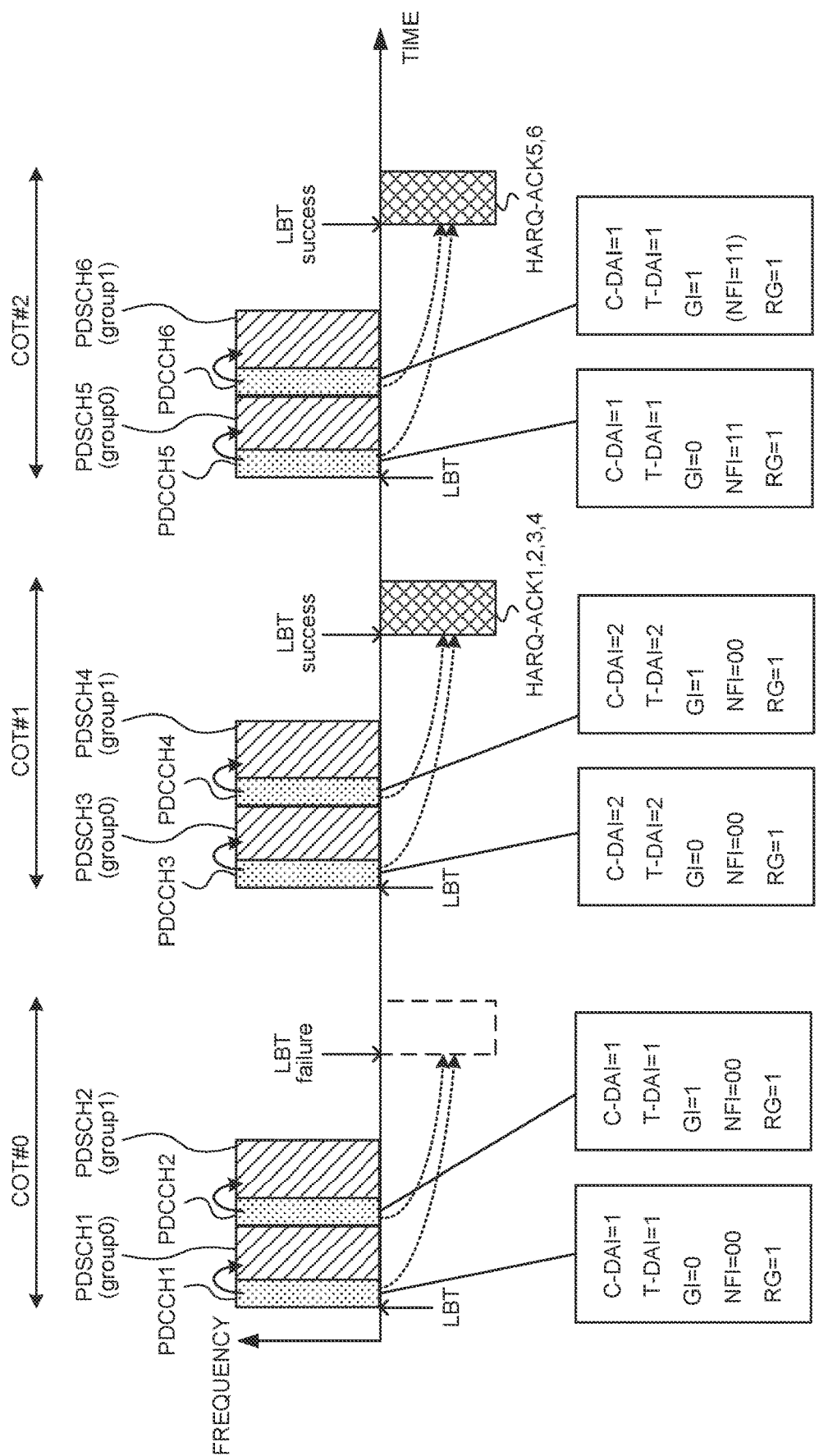
FIG. 5 is a diagram illustrating another example of retaining and resetting of the HARQ-ACK information by the NFI.

FIG. 5 is a diagram illustrating another example of retaining and resetting of the HARQ-ACK information by the NFI. FIG. 5 illustrates an example in which the number of bits of the NFI is 2. In the example of FIG. 5, PDSCH1 to PDSCH6 are scheduled by PDCCH1 to PDCCH6. The PDSCH group index (GI) of PDSCH1, PDSCH3 and PDSCH5 is 0. The PDSCH group index of PDSCH2 and PDSCH4 is 1.

In the example of FIG. 5, PDSCH1 to PDSCH6 are each scheduled by DCI received by each of PDCCH1 to PDCCH6. HARQ-ACK1 for PDSCH1 and HARQ-ACK2 for PDSCH2 are transmitted on transmission resources of HARQ-ACK3 and HARQ-ACK4 for PDSCH3 and PDSCH4, respectively, due to the LBT failure in COT #0.

In the example of FIG. 5, the UE receives DCI including the same value of the NFI (00) until transmitting HARQ- ACK (PDCCH1 to PDCCH4). As a result, the C-DAI and the T-DAI are accumulated. The UE performs transmission of HARQ-ACK1 to HARQ-ACK4, and then receives, by PDCCH5, DCI including a toggled value (11) of the NFI. In this way, in a case where both the values of the higher bit and the lower bit of the 2-bit NFI are toggled (1), the C-DAI and the T-DAI corresponding to both GI=0 and GI=1 are reset.

Note that although the value of the NFI corresponding to PDCCH6 is 11 in the example of FIG. 5, but the value of the NFI may be any value (for example, 00, 01, or 10).

(DCI Format for URLLC)

In Rel. 16 and later, introduction of a DCI format for a traffic type such as high-reliability and low-latency communication (for example, ultra-reliable and low-latency communications (URLLC)) is considered. The DCI format may be referred to as the DCI format 0_2 or the DCI format 1_2. The DCI format 0_2 may be DCI (UL grant) for scheduling a PUSCH. The DCI format 1_2 may be DCI (DL assignment) for scheduling a PDSCH.

The name of the new DCI format is not limited thereto. For example, the name of the new DCI format for scheduling the PDSCH and the PUSCH may be obtained by replacing "2" of the DCI format 1_2 and the DCI format 0_2 with an arbitrary character string other than "0" and "1" or may be another name.

The DCI format 0_2 and the DCI format 1_2 may be DCI formats in which a part of a payload is limited as compared with an existing DCI format (for example, DCI format 0_1 and DCI format 1_1).

Specifically, the DCI format 0_2 and the DCI format 1_2 do not have to allow code block group-based transmission and reception. In addition, a redundancy version (RV) field included in the DCI format 0_2 and the DCI format 1_2 may be configurable as 0 to 2 bits. Further, the HARQ process number field included in the DCI format 0_2 and the DCI format 1_2 may be configurable as 0 to 4 bits. Further, a sounding reference signal (SRS) request field included in the DCI format 0_2 and the DCI format 1_2 may be configurable as 0 to 3 bits.

Further, a PUCCH resource indicator field and a transmission configuration indication state (TCI) field included in the DCI format 1_2 may be configurable as 0 to 3 bits. Further, a carrier indicator field included in the DCI format 0_2 and the DCI format 1_2 may be configurable as 0 to 3 bits.

As described above, the number of bits of each field included in the DCI format 0_2 and the DCI format 1_2 can be set to be smaller than that in an existing DCI format (for example, DCI format 0_0, DCI format 0_1, DCI format 1_0, and DCI format 1_1), whereby the payload (size) of the DCI format can be reduced and the reliability of communication can be improved.

By the way, whether or not the DCI format used in the NR-U system is supported by the DCI format for URLLC has not been sufficiently studied.

Specifically, which field included in the DCI is supported or the number of bits included in the DCI in a case where the DCI format for URLLC is used as the DCI format used in the NR-U system have not been sufficiently studied.

In a case where such study has not been sufficiently conducted, when a traffic type such as URLLC is operated in the NR-U system, reduction in throughput or a degradation in communication quality may be caused.

Therefore, the present inventors have conceived an appropriate DCI configuration method in a case where a traffic type such as URLLC is operated in the NR-U system.

Hereinafter, embodiments according to the present disclosure will be described in detail with reference to the drawings. The radio communication methods according to the embodiments may be applied alone or in combination.

In the present disclosure, "A/B" may be read as at least one of A or B, and "A/B/C" may be read as at least one of A, B, or C.

In the present disclosure, an index, an ID, an indicator, a resource ID, and the like may be replaced with each other.

In the present disclosure, a first DCI format, DCI format 1_1, a DCI format for eMBB, a DCI format for PDSCH scheduling for eMBB, a DCI format that does not include the priority indicator field, a DCI format that does not include the priority indicator field for PDSCH scheduling, an existing DCI format, and a DCI format of Rel. 15 may be replaced with each other.

In the present disclosure, a second DCI format, DCI format 1_2, a DCI format for URLLC, a DCI format for PDSCH scheduling for URLLC, a DCI format including the priority indicator field, a DCI format including the priority indicator field for PDSCH scheduling, and a new DCI format may be replaced with each other.

In the present disclosure, at least one of a NR-U field, a specific field, a PDSCH group index field, a Number of requested PDSCH group(s) field, a New feedback indicator (NFI) field, and a One-shot HARQ-ACK request field, a field for at least one of one-shot HARQ-ACK feedback or an enhanced dynamic HARQ-ACK codebook, and a field having a size dependent on configuration of a higher layer parameter (for example, at least one of pdsch-HARQ-ACK-OneShotFeedback-r16 or pdsch-HARQ-ACK-Codebook=enhancedDynamic-r16) for at least one of the one-shot HARQ-ACK feedback or the enhanced dynamic HARQ-ACK codebook may be replaced with each other.

(Radio Communication Method)

First Embodiment

In a first embodiment, the NR-U field included in the second DCI format (for example, DCI format 1_2) will be described. The second DCI format may be according to any of the following supports 1 and 2.

[Support 1]

For the second DCI format, all the NR-U fields included in the first DCI format may be included. In other words, for the second DCI format, the UE may receive/monitor a PDCCH under the assumption that all of the fields for the NR-U system included in the first DCI format are included.

According to Support 1, even in a case where URLLC is used in the NR-U system, it is possible to use a common field between the DCI format for URLLC (for example, DCI format 1_2) and the DCI format for eMBB (for example, DCI format 1_1), and thus, it is possible to simplify the implementation of the UE.

[Support 2]

For the second DCI format, only a part (one or more fields) of the NR-U field included in the first DCI format may be included. In other words, for the second DCI format, the UE may receive/monitor a PDCCH under the assumption that one or more NR-U fields included in the first DCI format are included.

For example, for the second DCI format, the One-shot HARQ-ACK request field may be included. In this case, the UE may receive/monitor a PDCCH under the assumption that the One-shot HARQ-ACK request field is included in the second DCI format.

In addition, for example, for the second DCI format, the PDSCH group index field, the Number of requested PDSCH group(s) field, and the New feedback indicator (NFI) field may be included. In this case, the UE may receive/monitor a PDCCH under the assumption that the second DCI format includes the PDSCH group index field, the Number of requested PDSCH group(s) field, and the New feedback indicator (NFI) field.

In a case where the second DCI format does not include at least one NR-U field, the UE may be implicitly notified of a value of this field. In this case, for the NR-U field not included in the second DCI format, the UE may read and use some or all of bit strings of other fields included in the second DCI format. In addition, for the NR-U field that is not included in the second DCI format, the UE may read and use a bit string obtained by applying a certain formula to some or all of bit strings of other fields included in the second DCI format as a bit string of the unsupported field.

According to Support 2, the payload of the DCI can be set small, and more reliable communication can be performed.

Second Embodiment

In a second embodiment, in a case where the second DCI format is used in the NR-U system, the number of bits of the NR-U field included in the second DCI format will be described.

In a case where the One-shot HARQ-ACK request field is included in the second DCI format, the number of bits of the One-shot HARQ-ACK request field may be 0 or 1.

Further, in a case where the PDSCH group index field is included in the second DCI format, the number of bits of the PDSCH group index field may be 0 or 1.

Further, in a case where the new feedback indicator (NFI) field is included in the second DCI format, the number of bits of the NFI field may be 0, 1, or 2.

In addition, in a case where the Number of requested PDSCH group(s) field is included in the second DCI format, the number of bits of the Number of requested PDSCH group(s) field may be 0 or 1.

As described above, even in a case where URLLC is used in the NR-U system, the number of bits of the NR-U field (the field for at least one of the one-shot HARQ-ACK feedback or the enhanced dynamic HARQ-ACK codebook) in the second DCI format (for example, DCI format 1_2) is made the same as the number of bits of the NR-U field in the first DCI format (for example, DCI format 1_1), so that it is possible to simplify the implementation of the UE.

Alternatively, the number of bits of the NFI field in the second DCI format (for example, DCI format 1_2) may be different from that in the first DCI format. The number of bits of the NFI field in the second DCI format may be 0 or 1. The NFI field in the second DCI format may have a bit length of 1 bit in a case where a specific higher layer parameter (for example, pdsch-HARQ-ACK-Codebook) is configured as enhanced dynamic (for example, enhanced Dynamic or enhancedDynamic-r16) and may have a length of 0 bit in other cases. The number of bits of the NFI field in the second DCI format may be independent of whether or not another higher layer parameter is configured (enabled) (NFI-TotalDAI-Included-r16=enable).

At this time, the UE may determine (recognize) whether or not the generation/retaining (state) of the C-DAI, the T-DAI, and the HARQ-ACK information is reset by the 1-bit NFI included in the second DCI format. In other words, the UE may receive/monitor a PDCCH assuming DCI including the NFI of up to one bit.

Furthermore, at this time, the UE may transmit HARQ-ACK corresponding to a PDSCH of a certain PDSCH group (for example, PDSCH group i), and then receive another PDCCH (DCI) indicating the value of the toggled NFI of the PDSCH group in such a way that the generation of the HARQ-ACK information of the PDSCH group can be reset, or assume or expect to receive the another PDCCH.

Figure 6:
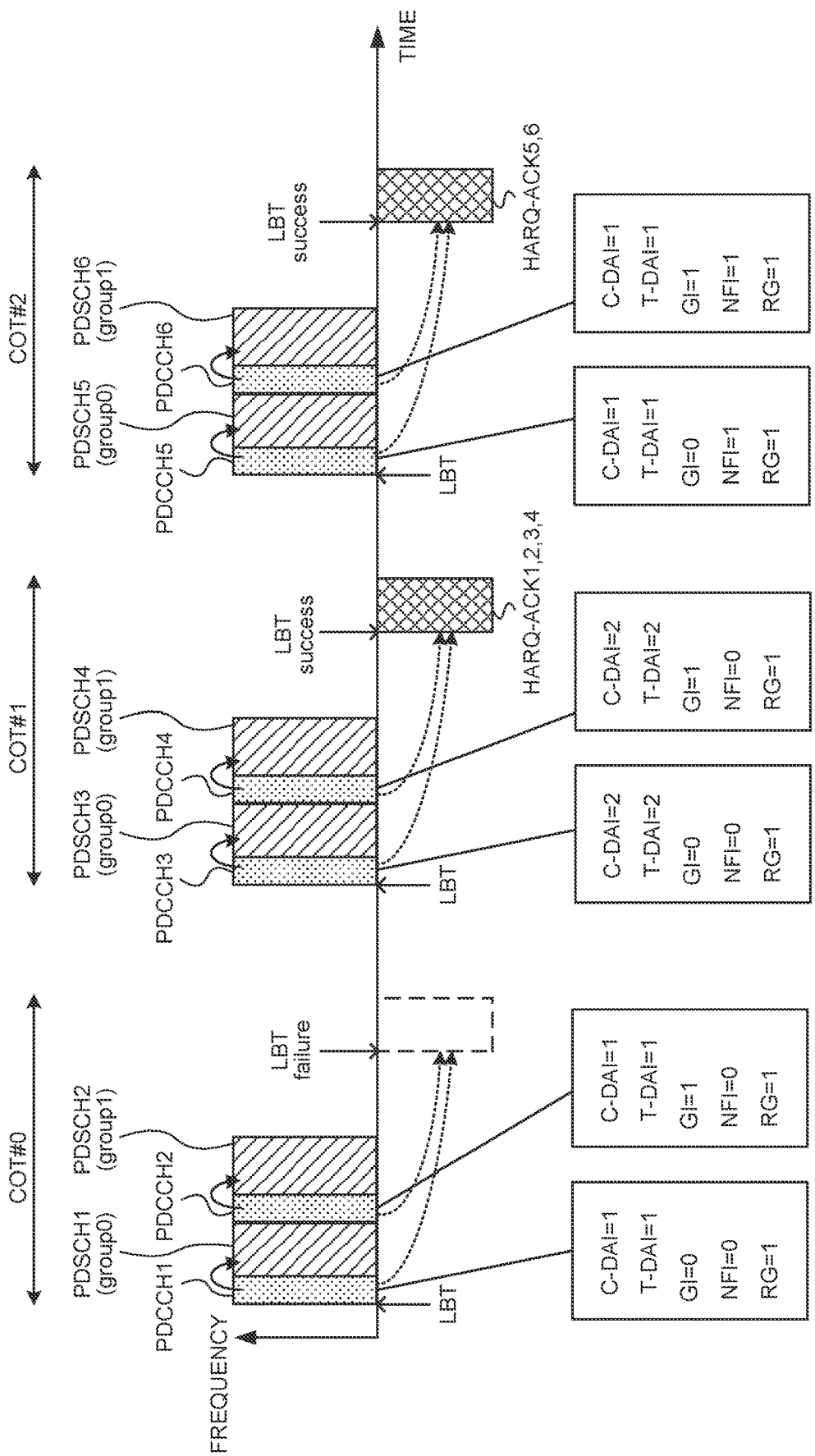
FIG. 6 is a diagram illustrating another example of retaining and resetting of the HARQ-ACK information by the NFI.

FIG. 6 is a diagram illustrating another example of retaining and resetting of the HARQ-ACK information by the NFI. Arrangement of each channel, a GI value corresponding to each channel, and LBT in FIG. 6 are the same as those in FIG. 5.

In the example of FIG. 6, the UE transmits HARQ-ACK1 to HARQ-ACK4 in the HARQ-ACK transmission resource in COT #1. The UE then receives PDCCH5 indicating NFI=1 (toggled NFI) to reset the generation of HARQ-ACK information for the PDSCH group 0 (GI=0). The UE then receives PDCCH6 indicating NFI=1 (toggled NFI) to reset the generation of HARQ-ACK information for the PDSCH group 1 (GI=1). In a case as in FIG. 6, the UE receives a PDCCH (DCI) including the NFI whose value is toggled for the PDSCH group 0 and the PDSCH group 1 after COT #1 (COT #2) in order to transmit the HARQ-ACK information for both the PDSCH group 0 and the PDSCH group 1 in COT #1.

As described above, in a case where the DCI format for URLLC is used in the NR-U system, the number of bits of the field for the NR-U system is set smaller than that of the DCI format (for example, DCI format 1_1) of Rel. 15, so that the payload of the DCI can be set small, and more reliable communication can be performed.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 7:
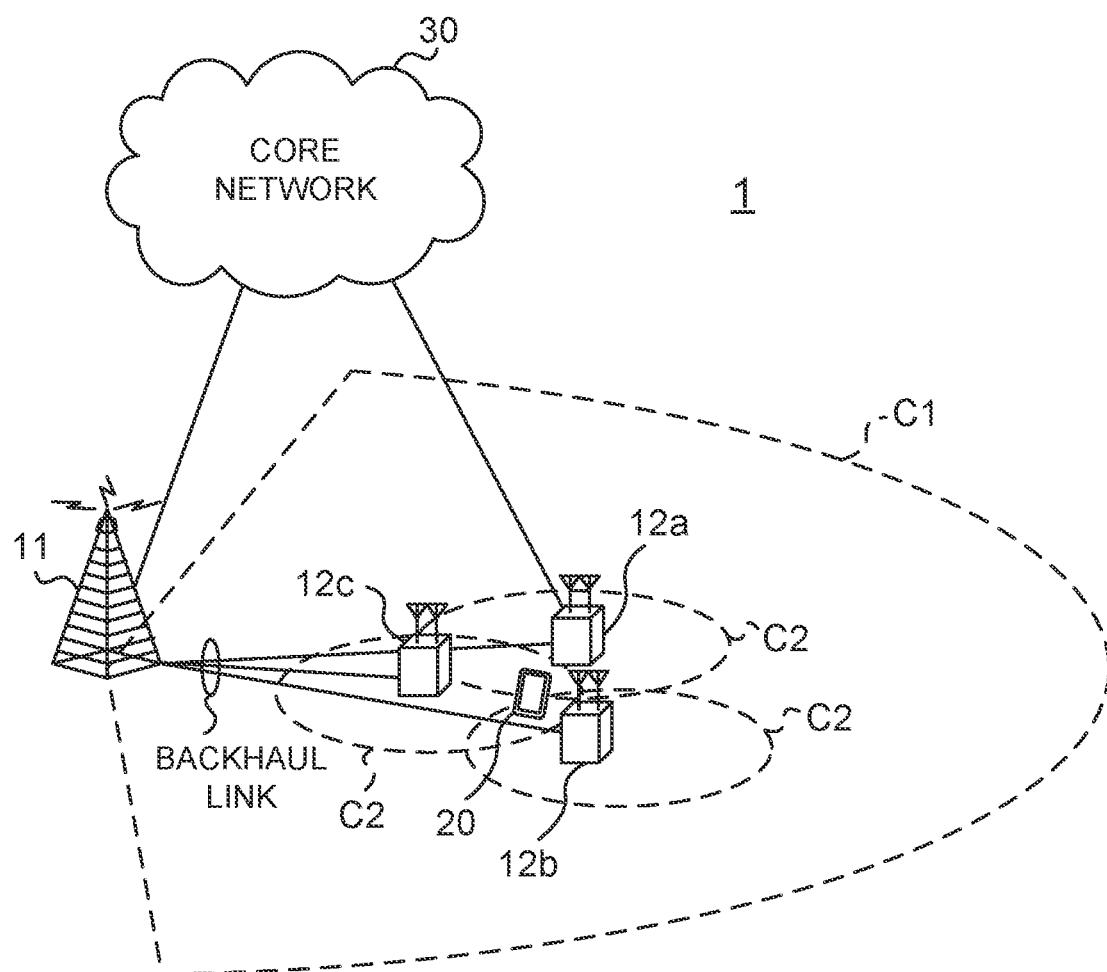
FIG. 7 is a diagram illustrating an example of a schematic configuration of a radio communication system according to one embodiment.

FIG. 7 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication in each CC using at least one of time division duplex (TDD) or frequency division duplex (FDD).

The plurality of base stations (for example, RRHs) 10 may be connected by wire (for example, an optical fiber, an X2 interface, or the like in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), or a next generation core (NGC).

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

Further, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that the DMRS may be referred to as a user terminal-specific reference signal (UE-specific reference signal).

(Base Station)

Figure 8:
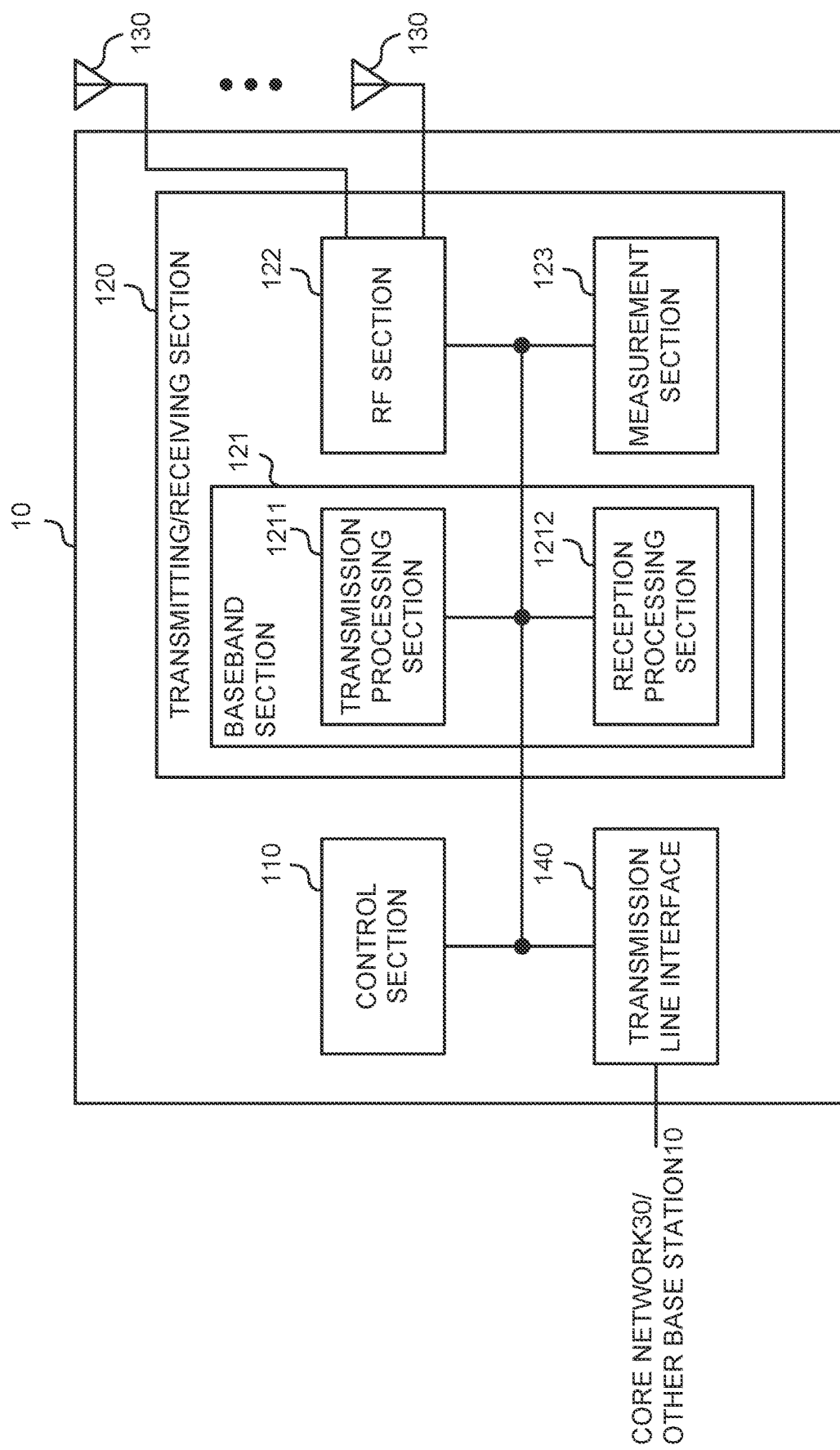
FIG. 8 is a diagram illustrating an example of a configuration of a base station according to one embodiment.

FIG. 8 is a diagram illustrating an example of a configuration of the base station according to one embodiment. The base station 10 includes a control section 110, a transmission/reception section 120, a transmission/reception antenna 130, and a transmission line interface 140. Note that one or more control sections 110, one or more transmission/reception sections 120, one or more transmission/reception antennas 130, and one or more transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be implemented by a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmission/reception section 120, the transmission/reception antenna 130, and the transmission line interface 140. The control section 110 may generate data to be transmitted as a signal, control information, a sequence, and the like, and may forward the data, the control information, the sequence, and the like to the transmission/reception section 120. The control section 110 may perform call processing (such as configuration or releasing) of a communication channel, management of the state of the base station 10, and management of a radio resource.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can include a transmission section/reception section, an RF circuit, a baseband circuit, a filter, a phase shifter, a measurement circuit, a transmission/reception circuit, and the like that are described on the basis of common recognition in the technical field related to the present disclosure.

The transmission/reception section 120 may be configured as an integrated transmission/reception section, or may be configured by a transmission section and a reception section. The transmission section may include the transmission processing section 1211 and the RF section 122. The reception section may be implemented by the reception processing section 1212, the RF section 122, and the measurement section 123.

The transmission/reception antennas 130 can be implemented by antennas described based on common recognition in the technical field related to the present disclosure, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a transmission beam or a reception beam by using digital beam forming (for example, precoding), analog beam forming (for example, phase rotation), and the like.

The transmission/reception section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmission/reception section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmission/reception section 120 (RF section 122) may perform modulation to a radio frequency band, filtering processing, amplification, and the like on the baseband signal, and may transmit a signal in the radio frequency band via the transmission/reception antenna 130.

Meanwhile, the transmission/reception section 120 (RF section 122) may perform amplification, filtering processing, demodulation to a baseband signal, and the like on the signal in the radio frequency band received by the transmission/reception antenna 130.

The transmission/reception section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmission/reception section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that the transmission section and the reception section of the base station 10 in the present disclosure may include at least one of the transmission/reception section 120, the transmission/reception antenna 130, or the transmission line interface 140.

The transmission/reception section 120 may transmit downlink control information (DCI) including the priority indicator field for physical downlink shared channel (PDSCH) scheduling. The control section 110 may control reception of Hybrid Automatic Repeat reQuest ACKnowledgement (HARQ-ACK) information for the PDSCH on the basis of the DCI. The DCI may include a field for at least one of one-shot HARQ-ACK feedback for the PDSCH or an enhanced dynamic HARQ-ACK codebook for the PDSCH (first embodiment).

(User Terminal)

Figure 9:
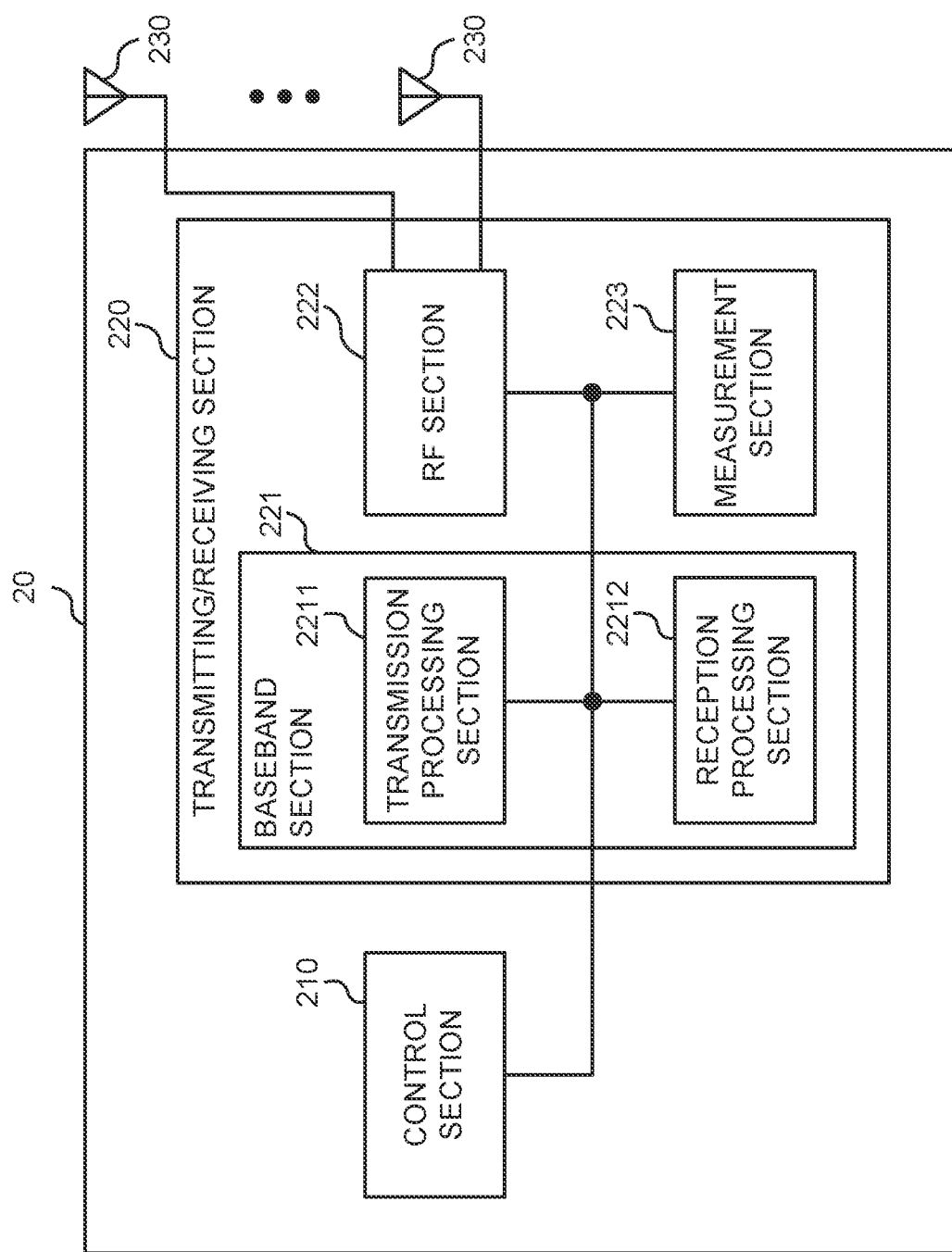
FIG. 9 is a diagram illustrating an example of a configuration of a user terminal according to one embodiment.

FIG. 9 is a diagram illustrating an example of a configuration of the user terminal according to one embodiment. The user terminal 20 includes a control section 210, a transmission/reception section 220, and a transmission/reception antenna 230. Note that one or more of the control sections 210, one or more of the transmission/reception sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmission/reception section 220 and the transmission/reception antenna 230. The control section 210 may generate data, control information, a sequence, and the like to be transmitted as signals, and may forward the data, control information, sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can be implemented by a transmitter/receiver, an RF circuit, a baseband circuit, a filter, a phase shifter, a measurement circuit, a transmitting/receiving circuit, and the like that are described based on common recognition in the technical field related to the present disclosure.

The transmission/reception section 220 may be formed as an integrated transmission/reception section, or may include a transmission section and a reception section. The transmission section may include the transmission processing section 2211 and the RF section 222. The reception section may include the reception processing section 2212, the RF section 222, and the measurement section 223.

The transmission/reception antenna 230 can include an antenna described on the basis of common recognition in the technical field related to the present disclosure, for example, an array antenna.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a transmission beam or a reception beam by using digital beam forming (for example, precoding), analog beam forming (for example, phase rotation), and the like.

The transmission/reception section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmission/reception section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (e.g., PUSCH), the transmission/reception section 220 (transmission processing section 2211) may perform DFT processing as the transmission processing in order to transmit the channel using a DFT-s-OFDM waveform. In a case where it is not the case, DFT processing need not be performed as the transmission processing.

The transmission/reception section 220 (RF section 222) may perform modulation to a radio frequency range, filtering processing, amplification, and the like on the baseband signal, to transmit a signal in the radio frequency range via the transmission/reception antenna 230.

Meanwhile, the transmission/reception section 220 (RF section 222) may perform amplification, filtering processing, demodulation to a baseband signal, and the like on the signal in the radio frequency range received by the transmission/reception antenna 230.

The transmission/reception section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmission/reception section 220 (measurement section 223) may perform measurement on the received signal. For example, the measurement section 223 may perform RPM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the reception section of the user terminal 20 in the present disclosure may include at least one of the transmission/reception section 220 or the transmission/reception antenna 230.

The transmission/reception section 220 may receive downlink control information (DCI) including the priority indicator field for physical downlink shared channel (PDSCH) scheduling. The control section 210 may control transmission of Hybrid Automatic Repeat reQuest ACKnowledgement (HARQ-ACK) information for the PDSCH on the basis of the DCI. The DCI may include a field for at least one of one-shot HARQ-ACK feedback for the PDSCH or an enhanced dynamic HARQ-ACK codebook for the PDSCH (first embodiment).

The DCI may include at least one of the PDSCH group index field, the Number of requested PDSCH group(s) field, the New feedback indicator field, or the One-shot HARQ-ACK request field (first embodiment).

A length of the New feedback indicator field may be 1 bit or less (second embodiment).

In a case where the enhanced dynamic HARQ-ACK codebook is configured, the DCI may include the PDSCH group index field of 1 bit and the New feedback indicator field of 1 bit. The New feedback indicator field may correspond to a PDSCH group indicated by the PDSCH group index field (second embodiment).

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be realized by combining the one apparatus or the plurality of apparatuses with software.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmission section (transmitting unit), a transmitter, and the like. In any case, as described above, the implementation method is not particularly limited.

Figure 10:
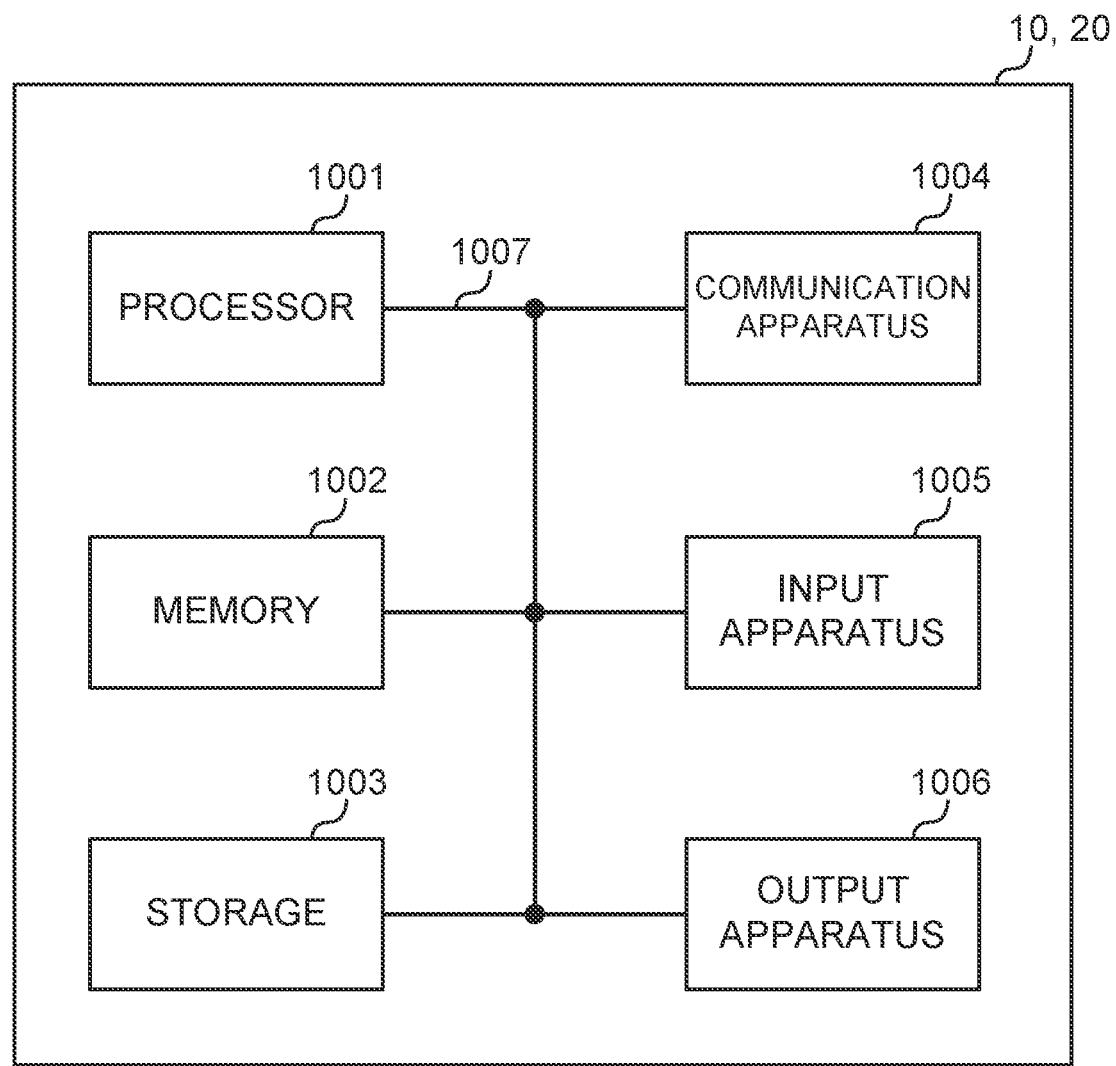
FIG. 10 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 10 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be included. Further, the processing may be executed by one processor, or the processing may be executed by two or more processors simultaneously or sequentially, or using other methods. The processor 1001 may be implemented by one or more chips.

Each function of the base station 10 and the user terminal 20 is implemented by predetermined software (program) being read on hardware such as the processor 1001 and the memory 1002, by which the processor 1001 performs operations, controlling communication via the communication apparatus 1004, and controlling at least one of reading or writing of data at the memory 1002 and the storage 1003.

The processor 1001 controls the entire computer by, for example, operating an operating system. The processor 1001 may be implemented by a central processing unit (CPU) including an interface with peripheral equipment, a control apparatus, an operation apparatus, a register, and the like. For example, at least a part of the above-described control section 110 (210), transmission/reception section 120 (220), and the like may be implemented by the processor 1001.

The processor 1001 reads programs (program codes), software modules, data, etc. from at least one of the storage 1003 or the communication apparatus 1004 into the memory 1002, and performs various types of processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as a "secondary storage apparatus".

The communication apparatus 1004 is hardware (transmission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmission/reception section 120 (220), the transmission/reception antenna 130 (230), and the like described above may be implemented by the communication apparatus 1004. The transmission/reception section 120 (220) may be implemented by physically or logically separating the transmission section 120a (220a) and the reception section 120b (220b) from each other.

The input apparatus 1005 is an input device for receiving input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, or the like). Note that the input apparatus 1005 and the output apparatus 1006 may be an integrated configuration (e.g., touch panel).

The apparatuses such as the processor 1001 and the memory 1002 are connected by a bus 1007 for communicating information. The bus 1007 may be formed using a single bus, or may be formed using different buses for different connections between the apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented using at least one of these pieces of hardware.

MODIFICATIONS

Note that terms described in the present disclosure and terms necessary for understanding the present disclosure may be replaced with terms that have the same or similar meanings. For example, a channel, a symbol, and a signal (signal or signaling) may be replaced with each other. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may be comprised of one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, the slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or a PUSCH) transmitted using a mini slot may be referred to as PDSCH (PUSCH) mapping type B.

A radio frame, a subframe, a slot, a minislot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that a unit representing a TTI may be referred to as a slot, a mini slot, or the like instead of a subframe.

Here, a TTI refers to, for example, a minimum time unit of scheduling in radio communication. For example, in the LTE system, a base station performs scheduling to allocate radio resources (a frequency bandwidth, transmission power, and the like that can be used in each user terminal) to each user terminal in TTI units. Note that the definition of a TTI is not limited to this.

The TTI may be a transmission time unit of a channel-coded data packet (transport block), a code block, a codeword, etc. or may be a processing unit of scheduling, link adaptation, etc. When the TTI is given, a time interval (e.g., the number of symbols) to which a transport block, a code block, a codeword, or the like is actually mapped may be shorter than the TTI.

When one slot or one mini slot is referred to as a TTI, one or more TTIs (that is, one or more slots or one or more mini slots) may be a minimum time unit of scheduling. The number of slots (the number of mini slots) constituting the minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

A long TTI (such as a normal TTI or a subframe) may be replaced with a TTI having a duration exceeding 1 ms. A short TTI (such as a shortened TTI) may be replaced with a TTI having a TTI length less than the TTI length of a long TTI and more than or equal to 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in an RB may be determined based on a numerology.

An RB may include one or more symbols in the time domain, and may have a length of one slot, one mini slot, one subframe, or one TTI. One TTI, one subframe, etc. may each be comprised of one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource domain of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE does not have to expect transmission/reception of a predetermined signal/channel outside the active BWP. Note that "cell", "carrier", etc. in the present disclosure may be replaced with "BWP".

Note that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

The information, parameters, etc. described in the present disclosure may be represented using absolute values, or may be represented using relative values with respect to predetermined values, or may be represented using other corresponding information. For example, a radio resource may be instructed by a predetermined index.

The names used for parameters etc. in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, etc. described in the present disclosure may be represented using any of a variety of different technologies. For example, data, an instruction, a command, information, a signal, a bit, a symbol, a chip, etc., which may be referred to throughout the above description, may be represented by a voltage, a current, an electromagnetic wave, a magnetic field or a magnetic particle, an optical field or an optical photon, or any combination of these.

Information, signals, etc. can be output in at least one of a direction from a higher layer to a lower layer or a direction from a lower layer to a higher layer. Information, signals, etc. may be input and output via a plurality of network nodes.

Input and output information, signals, etc. may be stored in a specific location (e.g., memory), or may be managed using a control table. The information, signals, and the like to be input and output can be overwritten, updated, or appended. The output information, signals, and the like may be deleted. Information, signals, etc. that have been input may be transmitted to another apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of predetermined information (for example, reporting of information to the effect that "X holds") does not necessarily have to be sent explicitly, and can be sent implicitly (for example, by not reporting this piece of information, by reporting another piece of information, and the like).

Determination may be performed using a value represented by one bit (0 or 1), or may be performed using a Boolean represented by true or false, or may be performed by comparing numerical values (e.g., comparison with a predetermined value).

Software, regardless of whether it is referred to as software, firmware, middleware, microcode, or a hardware description language, or referred to by another name, should be interpreted broadly to mean a command, a command set, a code, a code segment, a program code, a program, a subprogram, a software module, an application, a software application, a software package, a routine, a subroutine, an object, an executable file, an execution thread, a procedure, a function, etc.

Moreover, software, commands, information, and the like may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station or the mobile station may be called as a transmitting apparatus, a receiving apparatus, a wireless communication apparatus, and the like. Note that at least one of the base station or the mobile station may be a device mounted on a moving body, a moving body itself, and the like. The moving body may be a transportation (for example, a car, an airplane, or the like), an unmanned moving body (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel, a downlink channel, etc. may be replaced with a side channel.

Likewise, a user terminal in the present disclosure may be replaced with a base station. In this case, the base station 10 may have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

All references to the elements using designations such as "first" and "second" as used in the present disclosure do not generally limit the amount or sequence of these elements. These designations can be used in the present disclosure, as a convenient way of distinguishing between two or more elements. Thus, references to first and second elements do not mean that only the two elements can be employed, or that the first element must precede the second element in some form.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), ascertaining, and the like.

Furthermore, "determining" may be regarded as "determining" receiving (e.g., receiving information), transmitting (e.g., transmitting information), inputting, outputting, accessing (e.g., accessing data in memory), and the like.

Moreover, "determining" may be interpreted as "determining" resolving, selecting, choosing, establishing, comparing, and the like. In other words, "determining" used herein may be interpreted to mean making "determination" related to some action.

In addition, "determining" may be replaced with "assuming", "expecting", "considering", or the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". Note that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:
a receiver that receives downlink control information (DCI) for scheduling a physical downlink shared channel (PDSCH), the DCI including a One-shot Hybrid Automatic Repeat request ACKnowledgement (HARQ-ACK) request field; and
a processor that controls transmission of HARQ-ACK information for the PDSCH based on the One-shot HARQ-ACK request field,
wherein the DCI is a DCI format 1_2, and
wherein a PDSCH group index field, a number of requested PDSCH groups field, and a new feedback indicator field are not supported in the DCI.

2. The terminal according to claim 1, wherein the DCI format 1_2 is a DCI format for Ultra-Reliable and Low-Latency Communications (URLLC).

3. The terminal according to claim 1, wherein when a specific higher layer parameter is configured, the One-shot HARQ-ACK request field has 1 bit, and when the specific higher layer parameter is not configured, the One-shot HARQ-ACK request field is not present.

4. A radio communication method for a terminal, comprising:
receiving downlink control information (DCI) for scheduling a physical downlink shared channel (PDSCH), the DCI including a One-shot Hybrid Automatic Repeat request ACKnowledgement (HARQ-ACK) request field; and
controlling transmission of HARQ-ACK information for the PDSCH based on the One-shot HARQ-ACK request field,
wherein the DCI is a DCI format 1_2, and
wherein a PDSCH group index field, a number of requested PDSCH groups field, and a new feedback indicator field are not supported in the DCI.

5. A base station comprising:
a transmitter that transmits downlink control information (DCI) for scheduling a physical downlink shared channel (PDSCH), the DCI including a One-shot Hybrid Automatic Repeat request ACKnowledgement (HARQ-ACK) request field; and
a processor that indicates transmission of HARQ-ACK information for the PDSCH by using the One-shot HARQ-ACK request field,
wherein the DCI is a DCI format 1_2, and
wherein a PDSCH group index field, a number of requested PDSCH groups field, and a new feedback indicator field are not supported in the DCI.

6. A system comprising a base station and a terminal, wherein
the base station comprises:
a transmitter that transmits downlink control information (DCI) for scheduling a physical downlink shared channel (PDSCH), the DCI including a One-shot Hybrid Automatic Repeat request ACKnowledgement (HARQ-ACK) request field, and
the terminal comprises:
a receiver that receives the DCI; and
a processor that controls transmission of HARQ-ACK information for the PDSCH based on the One-shot HARQ-ACK request field,
wherein the DCI is a DCI format 1_2, and
wherein a PDSCH group index field, a number of requested PDSCH groups field, and a new feedback indicator field are not supported in the DCI.

* * * * *